(12) United States Patent
Ootsuka

(10) Patent No.: US 11,724,711 B2
(45) Date of Patent: Aug. 15, 2023

(54) VEHICLE IDLING STOP CONTROL METHOD AND VEHICLE IDLING STOP CONTROL DEVICE

(71) Applicant: Nissan Motor Co., Ltd., Yokohama (JP)

(72) Inventor: Toshihiko Ootsuka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/793,944

(22) PCT Filed: Jan. 21, 2020

(86) PCT No.: PCT/JP2020/001790
§ 371 (c)(1),
(2) Date: Jul. 20, 2022

(87) PCT Pub. No.: WO2021/149123
PCT Pub. Date: Jul. 29, 2021

(65) Prior Publication Data
US 2023/0051121 A1  Feb. 16, 2023

(51) Int. Cl.
*B60W 50/12* (2012.01)
*B60W 10/06* (2006.01)
*F02N 11/08* (2006.01)

(52) U.S. Cl.
CPC ............ *B60W 50/12* (2013.01); *B60W 10/06* (2013.01); *F02N 11/0822* (2013.01); *B60W 2510/0642* (2013.01); *B60W 2556/40* (2020.02)

(58) Field of Classification Search
CPC .. B60W 10/06; B60W 50/12; B60W 2556/40; F02N 11/0822
See application file for complete search history.

(56) References Cited

U.S. PATENT DOCUMENTS

| 4,466,392 A | * | 8/1984 | Uchida | ............... F02N 11/0814 123/333 |
| 7,657,366 B2 | | 2/2010 | Guy et al. | |
| 2005/0247280 A1 | * | 11/2005 | Asada | ................... F02N 11/101 307/10.3 |

(Continued)

FOREIGN PATENT DOCUMENTS

| EP | 1 469 195 B1 | 9/2006 |
| EP | 1 781 937 B1 | 4/2015 |

(Continued)

*Primary Examiner* — Edwin A Young
(74) *Attorney, Agent, or Firm* — Global IP Counselors, LLP

(57) ABSTRACT

A vehicle idling stop control device has switches that detect an operation of opening a driver's door and an unbuckling of a driver's seat belt as disembarkation operations by a driver. When a disembarkation operation performed by the driver is detected during an idling stop, the idling stop is cancelled and the engine is restarted upon detecting a disembarkation operation performed by a driver during the idling stop. Also, restarting of the idling stop is prevented due to ending of the disembarkation operation performed by the driver until after the vehicle starts traveling. Thus, unnecessary automatic stopping and automatic restarting of the engine are thereby avoided when the vehicle sets off without the driver actually exiting the vehicle.

5 Claims, 3 Drawing Sheets

(56) References Cited

U.S. PATENT DOCUMENTS

| | | | | |
|---|---|---|---|---|
| 2017/0253245 A1* | 9/2017 | Khafagy | ............... | B60W 10/06 |
| 2018/0105178 A1* | 4/2018 | Khafagy | ............... | B60W 10/06 |
| 2020/0149503 A1* | 5/2020 | Doki | .................. | F02N 11/0818 |

FOREIGN PATENT DOCUMENTS

| | | |
|---|---|---|
| JP | 2004-19448 A | 1/2004 |
| JP | 2011-106357 A | 6/2011 |
| JP | 2014-40794 A | 3/2014 |
| JP | 2015-34484 A | 2/2015 |

* cited by examiner

VEHICLE IDLING STOP CONTROL METHOD AND VEHICLE IDLING STOP CONTROL DEVICE

CROSS-REFERENCE TO RELATED APPLICATIONS

This application is a U.S. national stage application of International Application No. PCT/JP2020/001790, filed on Jan. 21, 2020.

BACKGROUND

Technical Field

This invention relates to a method and device for controlling an idling stop, in which an idling stop of an engine is performed at times such as when a vehicle comes to a temporary stop.

Background Information

An "idling stop" is a known feature in which an engine is stopped at times such as when a vehicle comes to a temporary stop at, for example, an intersection. Japanese Patent Application No. 2011-106357 (Patent Document 1) discloses a technique in which in order to avoid engine restarting when a passenger enters or exits a vehicle, idling stop is canceled and the engine is restarted if a rear door opens during an idling stop, and then the idling stop is resumed after a delay of about one to five seconds after the rear door closes.

However, with a configuration in which the idling stop is allowed to resume by closing the rear door in this manner, the engine is again restarted when the vehicle begins traveling immediately after the idling stop is resumed; therefore, the engine is restarted, stopped, and restarted again in a short time span, which is annoying to the driver.

SUMMARY

In the present invention, when a disembarkation operation performed by the driver is detected during an idling stop, the idling stop is canceled, the engine is restarted, and there is no resuming of the idling stop due to the end of the disembarkation operation performed by the driver thereafter.

For example, in the event of an operation opening the driver's door or a disembarkation operation in which the driver's seat belt is unbuckled, the idling stop is canceled and the engine is restarted in order to notify the driver that the "ignition switch" is on. In many cases, the driver actually exits following the disembarkation operation, and at that time, the ignition switch is usually operated so as to turn off. Conversely, even in cases in which the driver does not actually exit after the disembarkation operation and the disembarkation operation has ended (e.g., an operation of closing the driver's door, or re-buckling the driver's seat belt), the idling stop does not resume and the engine operation (combustion or rotation) continues. Therefore, vehicle travel can be begun without any changes, and there is no unnecessary stopping or restarting of the engine.

BRIEF DESCRIPTION OF THE DRAWINGS

Referring now to the attached drawings which form a part of this original disclosure.

DETAILED DESCRIPTION OF EMBODIMENTS

One embodiment of this invention is described in detail below with reference to the drawings.

Figure 1:
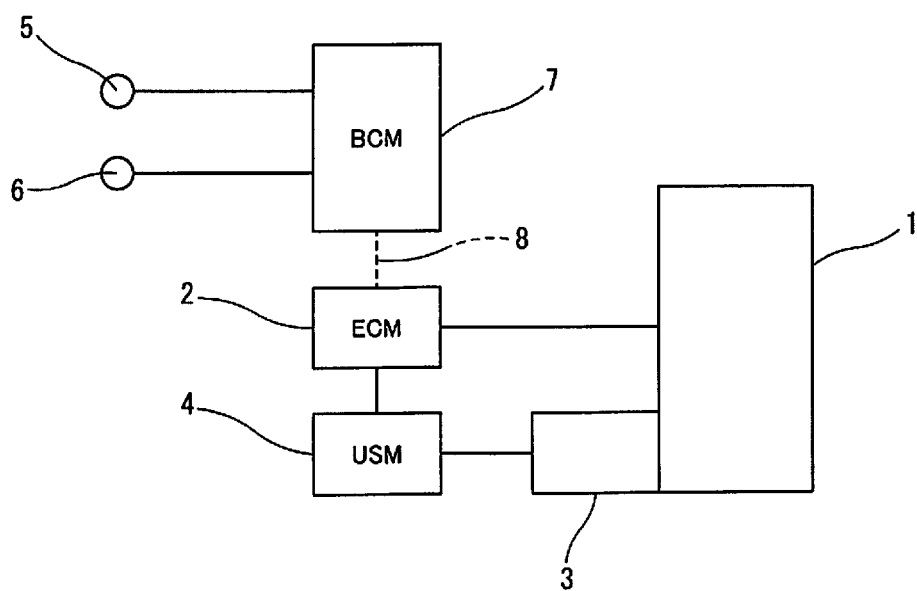
FIG. 1 is an explanatory drawing of a system configuration for an idling stop control device according to this invention.

FIG. 1 is an explanatory drawing of a system configuration for an idling stop control device according to this invention. A vehicle comprises, as a travel drive source, an engine 1 that is a gasoline engine, a diesel engine, or another internal combustion engine. The engine 1 is controlled by an engine control module (ECM) 2, and is capable of an idling stop in which combustion or rotation is stopped as necessary. The engine 1 comprises a starting motor 3 in order to perform restarts along with idling stop cancelations. The starting motor 3 is drivably controlled by an under-hood switching module (USM) 4 on the basis of a control command from the ECM 2. The USM 4 performs control for not only the starting motor 3 but also various other electric components of the vehicle.

In order to detect a disembarkation operation performed by the driver, the vehicle comprises a driver's door switch 5 that outputs a signal corresponding to the open/closed state of the driver's door, and a driver's seat belt switch 6 that outputs a signal corresponding to the worn state of the driver's seat belt. Detection signals from these switches 5, 6 are inputted to a body control module (BCM) 7 that manages various controls on the vehicle side. The BCM 7 and the ECM 2 are connected to each other via an in-vehicle network ("CAN communication") 8, and these modules exchange necessary signals. The term "disembarkation operation" refers to an operation performed along with or prior to the actual exiting of the driver, and in this embodiment, the operation of opening the driver's door and the unbuckling of the driver's seat belt are perceived as the disembarkation operation. Either one of the operation of opening the driver's door or the unbuckling of the driver's seat belt may alone be the disembarkation operation, or the unlocking of a door or another operation can be treated as the disembarkation operation.

Signals from various sensors (not shown) are inputted to the ECM 2 either directly or via the in-vehicle network 8 from the BCM 7 or another controller. Regarding at least idling stop control of the embodiment, detection signals from a vehicle speed sensor, an accelerator position sensor, a brake switch, a water temperature sensor, and other sensors are inputted to the ECM 2. Furthermore, signals indicating a charged state of a battery, an engine start request from a vehicle air-conditioning device, etc., are inputted to the ECM 2.

On the basis of these signals, the ECM 2 performs an automatic stop, i.e., an idling stop, of the engine 1 if a predetermined idling stop condition is met at times such as when, for example, the vehicle is waiting for a traffic light at an intersection. If a predetermined idling stop cancel condition is met during an idling stop, the idling stop is canceled and the engine 1 is automatically restarted. The present invention may be configured such that the ECM 2 and the BCM 7 are integrated as one controller.

The idling stop condition is an AND condition including several conditions, such as, for example, that the vehicle speed be 0, the accelerator position be 0, the brake switch be on (i.e., the brake pedal be depressed), a water temperature be equal to or greater than a predetermined temperature, the charged state of the battery be equal to or greater than a predetermined level, there be no engine start request from the vehicle air-conditioning device, and a travel history condition flag (described hereinafter) be "1." In other words, when all of these conditions are satisfied, the idling stop condition is assumed to be met and an idling stop is executed.

The idling stop cancel condition is an OR condition including any number of the following conditions, for example: that the accelerator position not be 0, the brake switch be off, the charged state of the battery be less than a predetermined level, there be an engine start request from the vehicle air-conditioning device, and the travel history condition flag be "0." In other words, when just one of these conditions is satisfied, the idling stop cancel condition is assumed to be met, the idling stop is canceled, and the engine 1 is restarted.

The travel history condition flag is a flag indicating whether or not travel at a vehicle speed exceeding a predetermined vehicle speed has been experienced since the most recent idling stop. The predetermined vehicle speed may be, for example, about 8 km/h. Due to the travel history condition flag being included in the idling stop condition, repetition of frequent automatic stopping and automatic restarting of the engine 1 during travel in heavy traffic is avoided. In other words, when the vehicle repeatedly travels and stops during heavy traffic, once an idling stop is executed, an idling stop will thereafter not be executed even if the vehicle stops unless the vehicle travels at a speed exceeding the predetermined vehicle speed (e.g., 8 km/h). In other words, the travel history condition flag is essentially set to "1" when the vehicle has traveled at the predetermined vehicle speed (e.g., 8 km/h), and is thereafter reset to "0" when an idling stop is executed and the idling stop is canceled (i.e., the engine is restarted).

In the present embodiment, when the driver's door is opened or the driver's seat belt is unbuckled, which are disembarkation operations, during an idling stop, the travel history condition flag is reset to "0" and the idling stop is canceled with the resetting. In other words, the engine 1 is restarted. This is a process for avoiding situations in which the driver mistakenly assumes the ignition switch is off and vacates the vehicle with the ignition switch left on. Due to the idling stop being canceled with a disembarkation operation, it is possible to easily perceive that the ignition switch is on when the driver actually exits the vehicle.

Because the travel history condition flag is reset to "0" by the disembarkation operation, even if the following disembarkation operation ends, i.e., the driver's door is closed or the driver's seat belt is re-buckled, the idling stop condition is not met and operation (combustion or rotation) of the engine 1 continues. Therefore, when vehicle travel is begun following the closing of the driver's door or the re-buckling of the driver's seat belt, the engine 1 is not stopped or restarted unnecessarily.

For example, after the vehicle has stopped at a highway tollbooth and gone into an idling stop, the driver might remove the seat belt in order to take a toll ticket. In such cases, the idling stop is canceled and the engine 1 is restarted along with the unbuckling of the seat belt, but if the idling stop is resumed when the seat belt is re-buckled after the toll ticket is taken, it will be necessary to start the engine 1 again when the vehicle sets off, and the engine 1 is restarted, stopped, and restarted again in a short time span. Such behavior is annoying and undesirable.

In the embodiment described above, after the engine 1 has restarted with a seat belt unbuckling from an idling stop state, the vehicle will not transition to an idling stop before the vehicle sets off.

Figure 2:
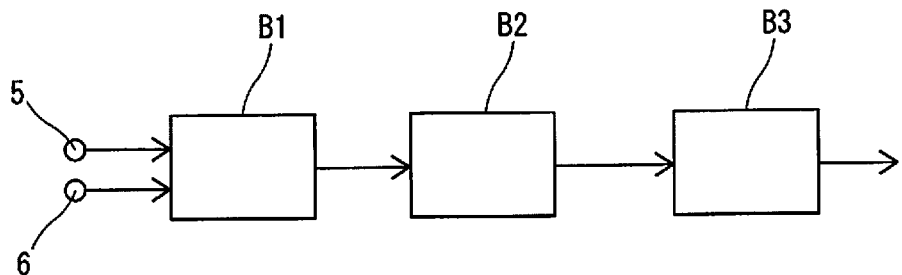
FIG. 2 is a block diagram of idling stop control.

In FIG. 2, idling stop control of the embodiment described above is shown in a function block diagram. In block B1, whether or not there is a disembarkation operation is determined on the basis of signals from the driver's door switch 5 and the driver's seat belt switch 6. In block B2, the travel history condition flag is set or reset. When there is determined to have been a disembarkation operation in block B1, the travel history condition flag is reset in block B2. In block B3, a final determination of whether or not to execute an idling stop is performed. When the idling stop condition described above is met including the travel history condition flag, a fuel cut signal is outputted in order to stop the engine 1. If the travel history condition flag is "0," an idling stop is not performed.

Figure 3:
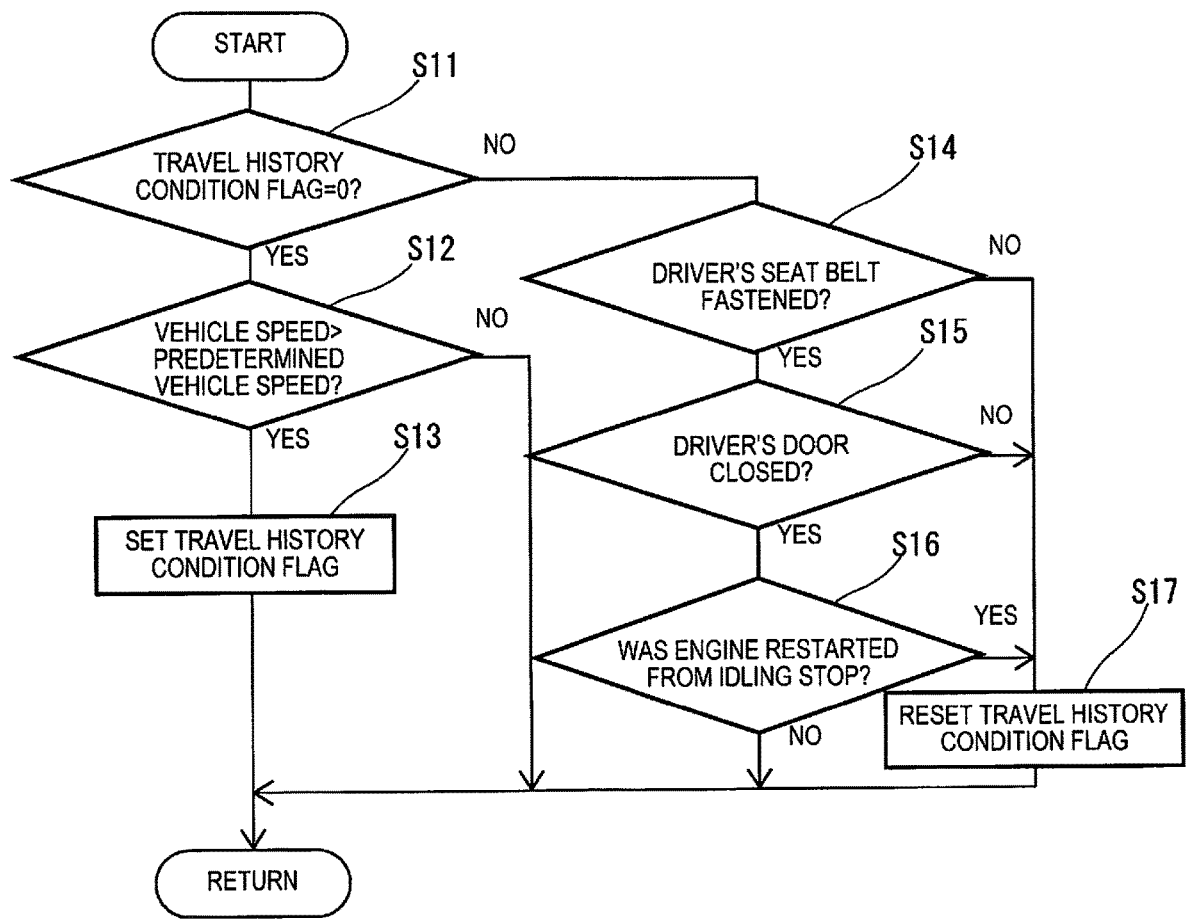
FIG. 3 is a flowchart of the flow of a process of a travel history condition flag.
Figure 4:
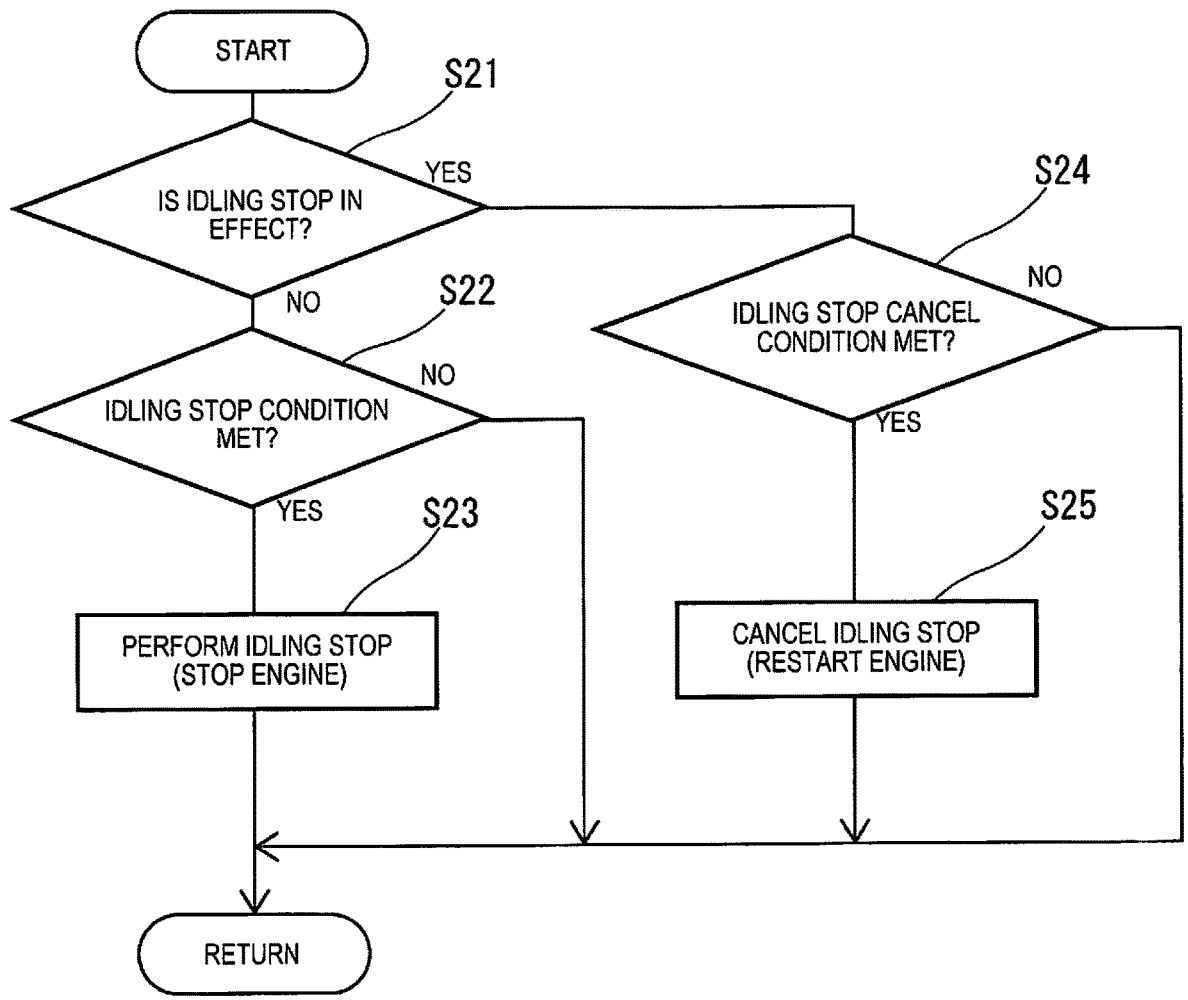
FIG. 4 is a flowchart of the flow of a process of idling stop control.

In FIGS. 3 and 4, idling stop control of the above embodiment is shown in flowcharts. FIG. 3 is a flowchart of the flow of the process of the travel history condition flag, and FIG. 4 is a flowchart of the flow of the overall process of idling stop control. The routines shown in these flowcharts are repeatedly executed in the ECM 2 (or the BCM 7) while the ignition switch is on.

In step S11 of FIG. 3, whether or not the travel history condition flag is "0" is determined, and if so, the process advances from step S11 to step S12. In step S12, whether the vehicle speed exceeds the predetermined vehicle speed (e.g., 8 km/h) is determined, and when the vehicle has been traveling above the predetermined vehicle speed, the process advances from step S12 to step S13. In step S13, the travel history condition flag is set to "1." If the vehicle speed does not exceed the predetermined vehicle speed in step S12, the routine is ended.

If the given travel history condition flag is "1" in step S11, the process advances to step S14. In step S14, whether or not the driver's seat belt is fastened is determined, and when the driver's seat belt is fastened, the process advances to step S15. In step S15, whether or not the driver's door is closed is determined. When the driver's seat belt is not fastened, the process advances from step S14 to step S17, and the travel history condition flag is reset to "0." When the driver's door is not closed, the process advances from step S15 to step S17 and the travel history condition flag is similarly reset to "0." In other words, when either an unbuckling of the driver's seat belt or an opening of the driver's door is detected, the travel history condition flag is reset in step S17.

When it is determined in step S14 that the driver's seat belt is fastened and it is determined in step S15 that the driver's door is closed, the process advances to step S16 and whether or not the engine was restarted from an idling stop state is determined. When it is determined that the engine was restarted from an idling stop state, the process advances from step S16 to step S17 and the travel history condition flag is reset to "0." As a result, when the vehicle begins traveling after an idling stop has once been executed, the travel history condition flag remains at "0" until the vehicle next experiences traveling at a vehicle speed exceeding the predetermined vehicle speed (e.g., 8 km/h). When the determination in step S16 is NO, the current routine is ended with the travel history condition flag left at "1."

In step S21 of FIG. 4, whether or not the vehicle is currently in an idling stop is determined, and if the vehicle is not in an idling stop, the process advances to step S22. In step S22, whether or not the idling stop condition has been met is determined. When it is determined in step S22 that the idling stop condition has been met, the process advances from step S22 to step S23 and an idling stop is executed. If the idling stop condition has not been met in step S22, the current routine is ended.

The idling stop condition is, as described above, an AND condition including several conditions, such as, for example, that the vehicle speed be 0, the accelerator position be 0, the brake switch be on (i.e., the brake pedal be depressed), the water temperature be equal to or greater than a predetermined temperature, the charged state of the battery be equal to or greater than a predetermined level, there be no engine start request from the vehicle air-conditioning device, and the travel history condition flag be "1." In other words, when all of these conditions are satisfied, it is determined that the idling stop condition is met.

When it is determined in step S21 that the vehicle is currently in an idling stop, the process advances from step S21 to step S24 and whether or not the idling stop cancel condition has been met is determined. When it is determined in step S24 that the idling stop cancel condition has been met, the process advances from step S24 to step S25, the idling stop is canceled, and the engine 1 is restarted. If the idling stop cancel condition has not been met in step S24, the current routine is ended with the idling stop continuing.

The idling stop cancel condition is, as described above, an OR condition including any number of the following conditions, for example: that the accelerator position not be 0, the brake switch be off, the charged state of the battery be less than a predetermined level, there be an engine start request from the vehicle air-conditioning device, and the travel history condition flag be "0." In other words, when just one of these conditions is satisfied, it is determined that the idling stop cancel condition has been met.

According to idling stop control shown in FIGS. 3 and 4, when a disembarkation operation such as the driver's door being opened or the driver's seat belt being unbuckled is performed while the vehicle has stopped and an idling stop is being executed, the idling stop cancel condition is met due to the travel history condition flag being reset to "0," and the idling stop ends and the engine 1 is restarted. Even if the end of the disembarkation operation, such as the driver's door being closed or the driver's seat belt being re-buckled, is then detected, the idling stop condition is not met because the travel history condition flag is "0," and the idling stop is therefore not resumed. In cases such as when the vehicle begins traveling without the driver actually exiting after a disembarkation operation, unnecessary automatic stopping and automatic restarting of the engine 1 are avoided.

Thus, in the embodiment described above, with the use of a travel history condition flag provided in order to avoid repetition of frequent automatic stopping and automatic restarting of the engine 1 during travel in heavy traffic, idling stops are prevented from being resumed with the end of disembarkation operations. Therefore, control becomes comparatively simple.

One embodiment of this invention was described in detail above with reference to the drawing, but the above embodiment is not provided by way of limitation on the invention; various changes can be made. For example, in the above embodiment, the travel history condition flag is used to prevent an idling stop from resuming with the end of a disembarkation operation, but flags associated with the disembarkation operation and the beginning of travel may be provided separate from the travel history condition flag so as to prevent idling stops during the time between disembarkation operations and the beginning of travel. The present invention can also be applied to idling stop control for an engine in a series hybrid vehicle that travels with the aid of a power generator and an electric motor.

The invention claimed is:

1. A vehicle idling stop control method for controlling an idling stop of a vehicle, the method comprising:
    performing an idling stop of an engine when predetermined conditions are met;
    cancelling the idling stop and restarting the engine upon detecting a disembarkation operation performed by a driver during the idling stop; and
    preventing the idling stop from being performed due to ending of the disembarkation operation performed by the driver until after the vehicle starts traveling.

2. The vehicle idling stop control method according to claim 1, wherein
    the disembarkation operation includes at least one of an opening of a driver's door and an unbuckling of a driver's seat belt.

3. The vehicle idling stop control method according to claim 2, wherein
    a travel history condition flag that is set when the vehicle travels at or above a predetermined vehicle speed is included as one of the predetermined conditions, and
    the travel history condition flag is reset upon detecting the disembarkation operation has been performed by the driver.

4. The vehicle idling stop control method according to claim 1, wherein
    a travel history condition flag that is set when the vehicle travels at or above a predetermined vehicle speed is included as one of the predetermined conditions, and
    the travel history condition flag is reset upon detecting the disembarkation operation has been performed by the driver.

5. A vehicle idling stop control device for controlling an idling stop of a vehicle, in which an idling stop of an engine is performed when predetermined conditions are met, the vehicle idling stop control device comprising:
    a detection switch that detects a disembarkation operation performed by a driver, and
    an engine control module configured to cancel the idling stop and restart the engine upon detecting the disembarkation operation by the driver during the idling stop, and the engine control module being further configured to prevent the idling stop from being performed due to ending of the disembarkation operation performed by the driver until after the vehicle starts traveling.

* * * * *